United States Patent [19]

Lang

[11] Patent Number: 4,800,699
[45] Date of Patent: Jan. 31, 1989

[54] MOLDING/LOCATING AND ATTACHING CLIP DEVICE

[75] Inventor: Steven C. Lang, Fraser, Mich.

[73] Assignee: General Motors Corporation, Detroit, Mich.

[21] Appl. No.: 85,621

[22] Filed: Aug. 14, 1987

[51] Int. Cl.$^4$ .............................................. E04F 19/02
[52] U.S. Cl. .................................... 52/717.1; 52/718.1
[58] Field of Search ............. 52/716, 717, 718, 717.1, 52/718.1

[56] References Cited

U.S. PATENT DOCUMENTS 3,606,721 9/1971 Meyer .................................. 52/718.1
4,249,356 2/1981 Noso ...................................... 52/717

FOREIGN PATENT DOCUMENTS 1200358 7/1970 United Kingdom .................. 52/718

Primary Examiner—James L. Ridgill, Jr.
Attorney, Agent, or Firm—W. A. Schuetz

[57] ABSTRACT

A molding/locator and attaching clip device includes a molding retainer clip which is adapted to be secured by a headed stud to a support panel and to which an open channel molding can be secured and, a molding locator clip which is adapted to be secured into a notched flange of the molding. Pawl arms on the molding retainer clip are adapted to engage ratchet teeth on the molding locator clip so that the molding and molding clip can be moved relative to the molding retainer clip in one direction and to prevent movement in the opposite direction.

3 Claims, 4 Drawing Sheets

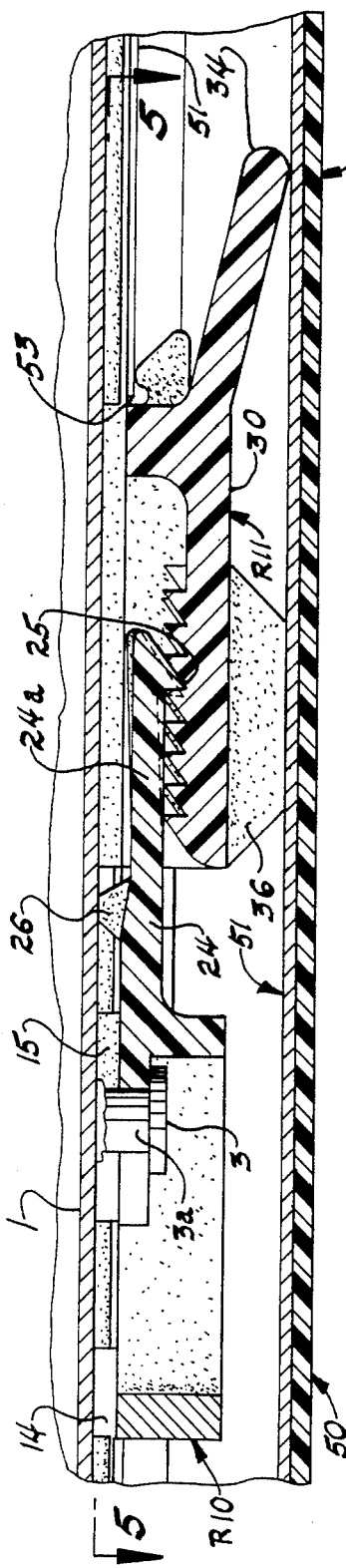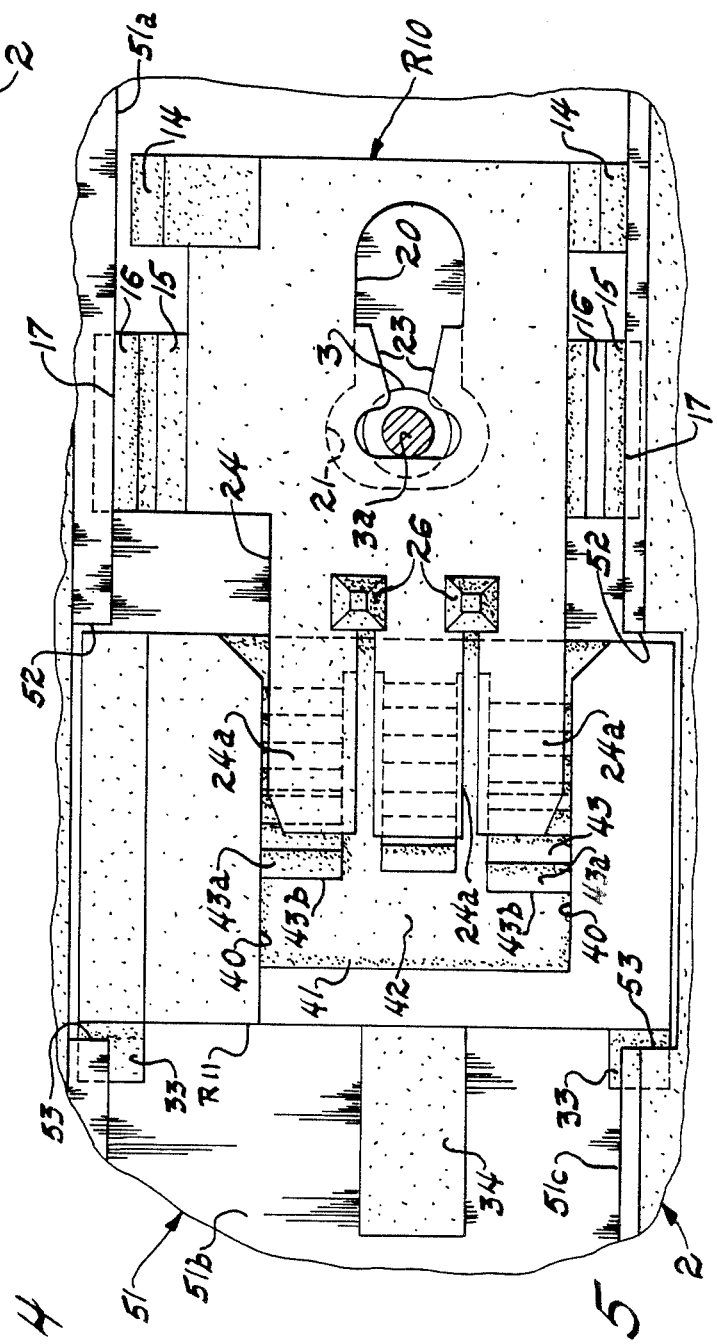

4,800,699

MOLDING/LOCATING AND ATTACHING CLIP DEVICE

FIELD OF THE INVENTION

This invention relates to a fastener used to secure a molding to a support member and, in particular, to a molding/locator and attaching clip device which includes a molding locator clip and a retainer molding clip used to secure and position a molding to a support panel.

DESCRIPTION OF THE PRIOR ART

Attaching clips, made of either metal, plastic or both have been in common use, especially on automotive vehicles, to attach moldings, in the form of open channel members, to a support panel on the body of such a vehicle and, thus such attaching clips are also referred to as molding clips. In a common form of such molding clips, the body of each molding clip is provided with at least one key-hole slot whereby it can be secured onto a headed stud welded to the support panel, the body further having opposed recessed edge members which can engage the return bent flanges of an open channeled molding member. Also, as well known, a plurality of such headed studs and molding clips are used to attach an elongated strip of molding to the support panel of a vehicle body.

There is disclosed in Applicant's copending U.S. patent application Ser. No. 019,251, filed Feb. 26, 1987 and assigned to a common assignee, an improved molding attaching clip of plastic material which includes a molding attaching clip adapted to be attached to a molding locator clip secured in the molding, the molding attaching clip having at least one key-hole slot therein for its assembly to a headed stud on a support panel and a pair of spaced apart resilient retaining tooth arms which are adapted to slide over a set of plural detent or ratchet lock teeth in the molding locator clip when moved in one direction but to lockingly engage the lock teeth when movement is attempted in the opposite direction.

SUMMARY OF THE INVENTION

The present invention relates to a two-piece molding clip device of plastic material which includes a lock down or molding retainer clip having at least one keyhole slot therein for its assembly to a headed stud on a support panel; molding retaining means on opposite sides thereof to engage a molding; and, end extending spaced apart resilient retaining tooth arms. The device also includes a molding locator clip which is adapted to be first inserted into and fixed in a molding after which the molding is secured to the molding retainer clip. The molding can then be moved to a position at which the resilient retaining tooth arms are adapted to slide over sets of plural detent or ratchet teeth in the molding locator clip when movement occurs in one direction but to lockingly engage one set of ratchet teeth to prevent movement in the opposite direction.

It is therefore a primary object of this invention to provide an improved molding/locator and attaching clip device which includes a lock down or molding retainer clip having at least one key-hole slot therein whereby it can be first assembled to an associate headed stud fixed to a support panel and a molding locator clip which is constructed to be attached to a molding. The molding with molding locator clip attached thereto is then secured to the molding retainer clip after which the molding clip can be moved in one direction, with the retainer molding clip and molding locator clip having associate resilient retaining tooth arms moving across engaging sets of ratchet teeth until the molding is located as desired with the retaining tooth arms then lockingly engaging at least one set of ratchet teeth to prevent movement of the molding in the opposite direction.

For a better understanding of the invention as well as other objects and further features thereof, reference is had to the following detailed description of the invention to be read in connection with the accompanying drawings.

BRIEF DESCRIPTION OF THE DRAWINGS

FIG. 4 is an enlarged cross-sectional view of the assembly of FIG. 1 taken along line 4—4 of FIG. 1;

FIG. 5 is an enlarged view of the assembly of FIG. 1 taken along line 5—5 of FIG. 4, but with the support panel, not shown, so as to thus more clearly show the inboard portions of the assembly;

DESCRIPTION OF THE PREFERRED EMBODIMENTS

Figure 1:
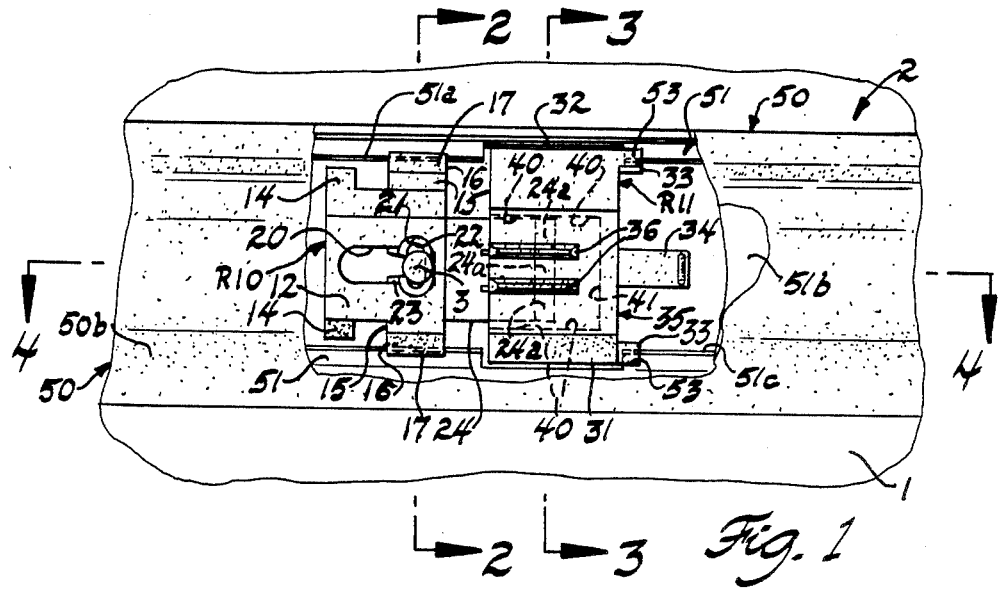
FIG. 1 is a side view of a portion of a vehicle support panel with a right hand, molding/locator attaching clip device in accordance with the invention holding a relatively narrow molding to the support panel, a portion of the molding being broken away to show details of the molding/locator attaching clip device.
Figure 2:
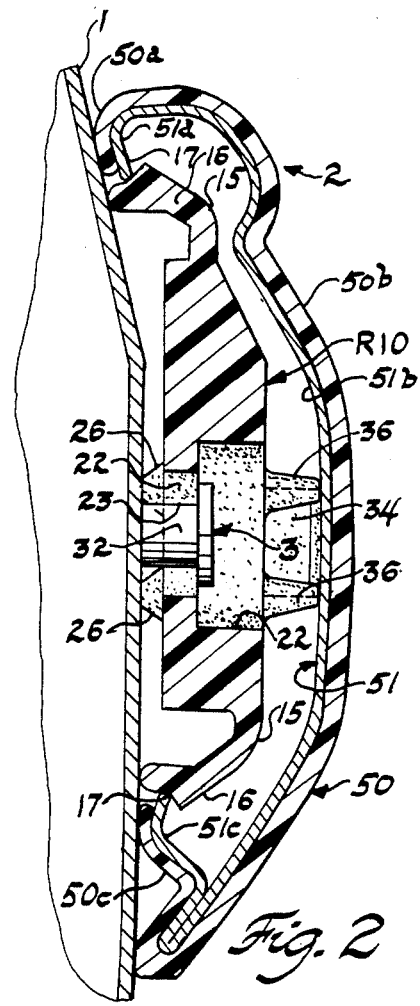
FIG. 2 is an enlarged cross-sectional view of the assembly of FIG. 1 taken along line 2—2 of FIG. 1.
Figure 9:
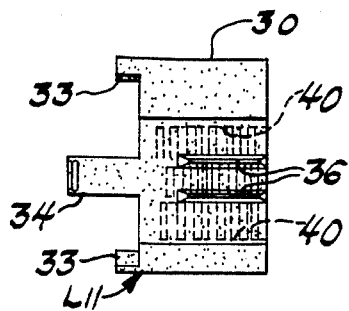
FIGS. 9 and 10 are views of the molding locator clip, per se, and of the molding retainer clip, per se, respectively, elements of a left hand molding/locator attaching clip device of the type shown in FIGS. 1-5, inclusive; and, FIGS. 11 and 12 are views of the molding locator clip, per se, and of the molding retainer clip, per se, respectively, elements of a left hand molding/locator attaching clip device of the type shown in FIGS. 6-8, inclusive, the molding retainer clip being shown in its as-molded configuration.
Figure 10:
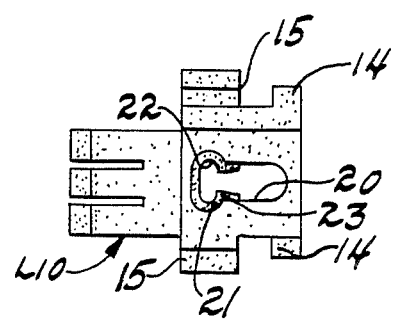

Referring first to FIGS. 1 to 5 there is shown a right hand embodiment of a molding/locator and attaching clip device for use in securing a relatively narrow molding, generally designated 2, to a support panel 1 on one or right hand side of a vehicle, while in FIGS. 9 and 10 there is shown the separate elements for a left hand version of the same embodiment of a molding/locator and attaching clip device but orientated for use in securing a similar molding to a support panel on the opposite or left hand side of a vehicle. As shown in FIGS. 1, 2 and 5, a headed stud 3 is secured, as by welding, to the support panel 1 whereby the subject clip assembly can be secured to the support panel 1 in a manner to be described.

Since the right hand molding/locator and attaching clip device is similar to the left hand molding/locator and attaching clip device except for the opposite orientation or location of certain parts thereof because of the difference in hand, only the right hand, molding/locator and attaching clip device of FIGS. 1 to 5 will be described in detail herein.

Now, as best seen in FIGS. 1, 4 and 5, the right hand embodiment of the molding locator and attaching clip device, made of a suitable plastic material, includes a molding retainer clip R10 and a molding locator clip R11.

The molding retainer clip R10 includes a body portion 12 having on opposite sides thereof an outwardly extending and depending contact leg 14 and spaced horizontally therefrom, with reference to FIG. 1, an outwardly extending and depending, somewhat flexible finger 15 that terminates adjacent to its free end in a depending flange which includes a cam ramp surface 16 that terminates at a notched portion 17. As shown in FIG. 1, the legs 14 extend from opposite sides of the body portion 12, while the finger 15 extend from opposite sides of the body portion 12 on its right hand end with reference to this Figure, with the legs 14 and the free ends of the fingers 15 engaging the support panel 1 when installed thereon as described hereinafter.

In addition, the body portion 12 is provided with a central key slot, of T-shape, that includes, with reference to FIG. 1, a horizontal extending base slot 20 and a vertical extending bar slot 21, the base slot 20 at its left hand end, with reference to FIG. 1 being sized so as to loosely receive the head of a headed stud 3, while the right hand end of this slot 20 is provided with lower restricted side shoulders 23 and the bar slot 21 is also provided with lower side shoulders 23 to capture the shank 3a of the headed stud 3 and to effect retention of the head of the headed stud 3 in a known manner.

Again with reference to FIG. 1, the body portion 12 is provided with a reduced thickness tooth arm 24 extending outward from its right hand end or edge, the outer free end of the tooth arm 24 being pierced or slotted so as to define a plurality of resilient pawls or tooth arms 24a, each having an upward extending pawl or tooth 25 thereon at its free edge. In the construction shown, there are three such tooth arms 24a, with their pawls or teeth 25 located in alignment with each other.

In the construction shown and as best seen in FIGS. 2 and 5, the tooth arm 24 is provided with a spaced apart pair of depending panel contact pads 26 located next adjacent to the tooth arms 24a. As shown in FIG. 4, when the molding retainer clip R10 is secured by the headed stud 3 to the body panel 1, these panel contact pads 26 and the free end edges of the legs 14 and flexible fingers 15 will abut against the body panel 1 even if the latter is slightly curved as shown in FIGS. 2 and 3.

Figure 3:
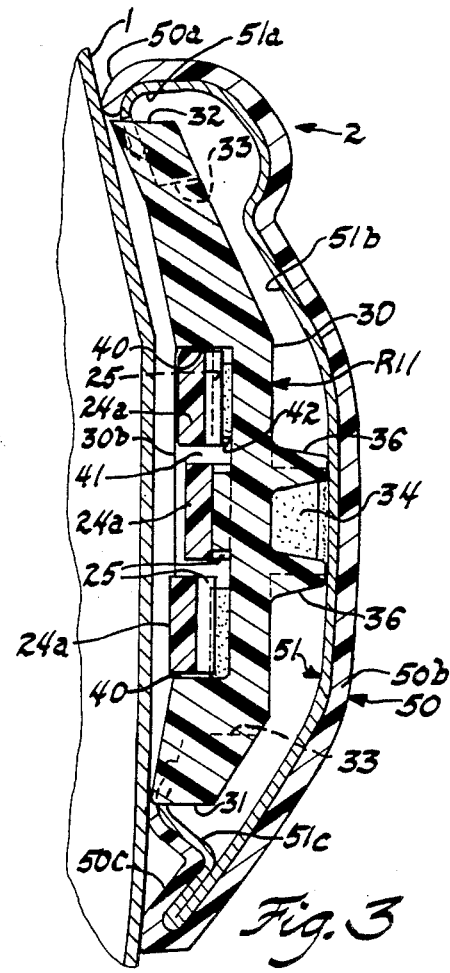
FIG. 3 is an enlarged cross-sectional view of the assembly of FIG. 1 taken along line 3—3 of FIG. 1.

Referring now to the molding locator clip R11, it includes a body portion 30, which as best seen in FIG. 3 from an end thereof, is of arched configuration so as to, in effect, have opposed lower and upper side edges 31 and 32, respectively, with reference to FIGS. 1 and 3. The body portion 30, at its right hand end with reference to FIG. 1, is provided with spaced apart notched retaining tabs 33 forming an upper extension of the material forming the side edges 31 and 32 and, intermediate these retaining tabs 33 the body portion 30 is provided with a flexible bias finger tab 34, which in its as-molded configuration, extends a predetermined upward height above the maximum nominal height of the upper surface of the body portion 30.

In addition and as best seen in FIGS. 1, 2, 3 and 4, the body portion 30 is also provided, in the construction illustrated, with a pair of upstanding anti-rattle ribs 36, extending parallel to each other and to the finger tab 34.

The body portion 30, opposite the tabs 33 and finger-tab 34, is provided with an enlarged cavity that extends from the bottom or lower central surface 30b and is defined by spaced apart side walls 40, an end wall 41 and a base wall 42 provided with rows of spaced apart ratchet teeth or detents 43 extending from the opening end of the cavity. In the construction illustrated, there are three such rows of detents 43. Each such detent 43, as best seen in FIG. 4, includes an inclined ramp surface 43a and a flat abutment shoulder or surface 43b for a purpose to be described, with the spacing between the abutment surfaces 43b being of a predetermined extent, as desired, for a particular vehicle application. In addition, in the construction shown and as best seen in FIG. 3, the abutment surfaces 43b of the different row of detents 43 are staggered relative to each other for a purpose to be described.

As shown in FIGS. 1 to 5, the subject molding/locator and attaching clip device is useful to attach a relatively narrow molding 2 of a predetermined length to a metal support panel 1 of a vehicle, the support panel 1 also being of a predetermined complementary length at the attachment location of the molding 2.

As conventional, a longitudinal extending row of spaced apart headed studs 3 are suitably fixed, as by having the shanks 3a thereof welded to the support panel 1 at a predetermined location, only one such headed stud 3 being shown in FIGS. 1, 2, 4 and 5.

The molding 2, in the embodiment shown in FIGS. 1 to 5, includes an outer molding member 50 made of a suitable material, such as an extruded suitable plastic material, and a suitably attached inner metal open channel member 51 that conforms substantially in shape to the interior surface of the outer molding member 50.

As best seen in FIGS. 2 and 3 and with reference thereto, the open channel member 51 includes an upper return bent flange 51a, an intermediate curved min body portion 51b, in the construction illustrated, and a lower return bent flange 51c. The outer molding member 50 includes an upper return bent flange 50a, which partly overlaps the return bent flange 51a so as to leave a free end portion of this flange 51a exposed, an intermediate portion 50b which overlies the main body portion 51b of the member 51 and a lower return bent flange 50c that partly overlaps the flange 51c of member 51 while leaving the free end of this flange 51c exposed, as best seen in FIG. 2.

In addition and as best seen in FIGS. 1 and 5, portions of the return bent flanges 51a and 51c are notched, as at 52 at predetermined longitudinal locations for each molding locator clip R11 so as to define corner abutment/retainers 53 for the retaining tabs 33 whereby to limit movement of the molding 2 relative to an associate molding locator clip R11 in one direction, to the right with reference to FIG. 1 by engagement of the corner abutment/retainers 53 against the associate body portion 30 of the molding locator clip R11. These elements are shown as being out of contact in FIGS. 1 and 5 for purpose of illustration only.

To effect assembly of the molding 2 to the support panel 1, each of the retainer molding clips R10 for retaining a particular molding 2 are secured to the necessary headed studs 3 previously fixed to the support panel 1. An assembler would, as one step of the assembly process, position a molding retainer clip R10 so that the head of an associate headed stud 3 will first extend into the enlarged end of the base slot 20 and then the retainer molding clip R10 is forcibly moved to the left with reference to FIGS. 1 and 5, to the position shown in these Figures, so that the retainer molding clip R10 is firmly secured to the support panel 1, while still permitting, with reference to FIG. 1, limited vertical up or down movement of this clip. As thus assembled to the support panel, the contact legs 14, the free ends of the fingers 15 and the contact pads 26 of the molding retainer clip R10 will abut against the support panel, the engaged positions of the fingers 15 and contact pad 26 being shown in FIG. 2 while that of a finger 14 being shown in FIG. 4.

The assembler then, as a second step of the assembly process, mounts each of the molding locator clips R11 to the molding 2 at an associate slot 52 location as best seen in FIGS. 1 and 5. Thus with reference to FIG. 1, the assembler will, from the open channel side of the channel member 51 of the molding 2, insert the molding locator R11 at a tilted angle with the finger tab 34 end first, while applying sufficient force to deflect the finger tab 34 in a direction toward the upper ends of the anti-rattle ribs 36 so that the retaining tabs 33 will abut against the abutment/retainer 53 of the channel member 51. This, in effect, causes the molding/locator clip R11 to pivot about the retaining tabs 33 and abutment-/retainer 53 interface whereby this clip R11 is secured to the channel member 51 of the molding 2 by the bias force of the finger tab 34 forcing the anti-rattle ribs 36 into forced abutment against the inner surface of the body portion 51b of the channel member 51, as best seen in FIGS. 3 and 4.

After all of the molding retainer clips R10 have been secured to the support panel 1 and all of the molding locator clips R11 have been secured to the associate molding 2, the assembler can then position the molding 2 at a location such that a molding locator clip R11 is positioned to the right side of the body portion 12 of an associate molding retainer clip R10 and so that the left hand edge, not shown, of the molding 2 is located a slight distance to the right of the left hand edge, not shown, of the support panel 1. Since the retainer molding clip R10 and molding locator clip R11 are right hand elements, it will be apparent that the support panel 1 shown would be on the right hand side of the vehicle and, accordingly, the left hand edge, not shown, of the support panel 1 would, in effect, be the front edge of the support panel 1.

The assembler thereafter, with reference to FIG. 2, would tilt the molding 2 so as to effect engagement of the upper return bent flange 51a into the notched portion 17 of the upper finger 15 of the molding retainer clip R11 and then pivot the molding 2 in a clockwise direction with reference to this Figure so as to cause the lower flange 51c of the channel member 51 to engage and ride down the cam ramp surface 16 of a finger 15 whereby the free end of the flange 51c engages into the notched portion 17 of the finger 15, as shown in FIG. 2.

Thereafter the molding 2 can be moved to the left, with reference to FIG. 1, until the left hand end, not shown, of the molding 2 is substantially aligned with the left hand or front end, not shown, of the support panel 1. It will be apparent that as this occurs, the teeth 25 on the tooth arms 24 will ride up and over the ramp surfaces 43a of the detents 43, with one of the teeth 25 of one of the tooth arms 24 of the molding retainer clip R10 then engaging an associate abutment surface 43b on an associate row of detents in the molding locator clip R11.

By way of an example, in a particular application, the abutment surfaces 43b of each row of detents on a molding retainer clip R11 were spaced 1 mm apart. Of course, then by staggering the abutment surfaces 43b of each row of detents 43 relative to each other in the manner shown in FIG. 5, the molding locator clip R11, as attached to the molding 2, could, in effect, be moved to the left, with reference to FIG. 1, relative to the associate fixed retainer molding clip R10 in increments of ⅓ mm.

It should now be apparent to those skilled in the art that the left hand molding locator clip L11 shown in FIG. 9 and the left hand molding retainer clip L10, shown in FIG. 10, are structurally and functionally similar to the molding locator clip R11 and molding retainer clip R10, respectively, except for the change of hand.

An alternate embodiment of a molding/locator and attaching clip device in accordance with the invention and constructed for use in securing a relatively wide molding to a support panel of a vehicle is shown in FIGS. 6, 7, 8, 11 and 12, wherein similar parts are designated by similar numerals but with the addition of a prime (') where appropriate.

Figure 6:
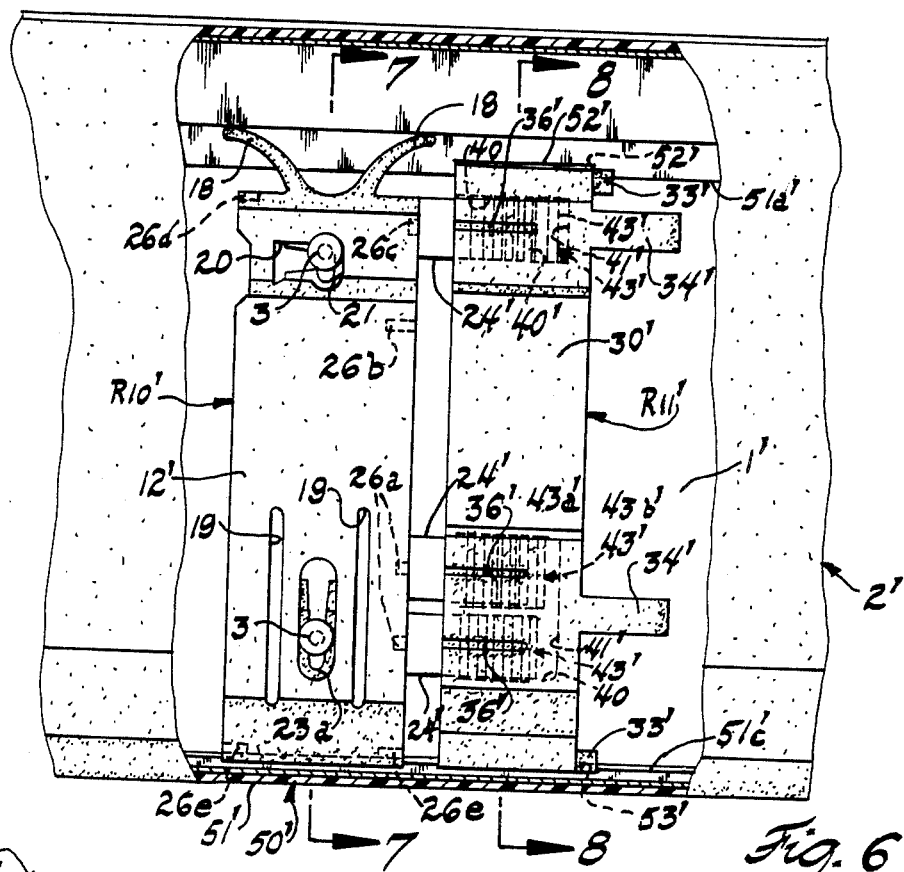
FIG. 6 is a side view similar to FIG. 1 but showing an alternate embodiment of a right hand, molding/locator attaching clip assembly in accordance with the invention used to hold a wide molding to a vehicle support panel.
Figure 7:
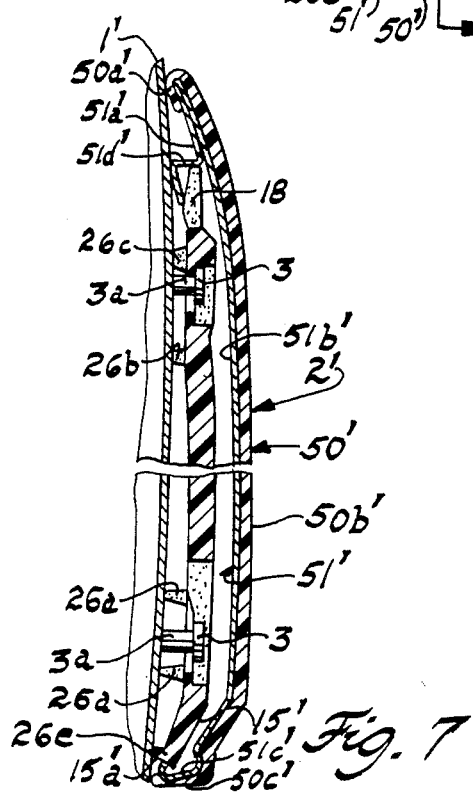
FIG. 7 is a cross-sectional view of the assembly of FIG. 6 taken along line 7—7 of FIG. 6.
Figure 8:
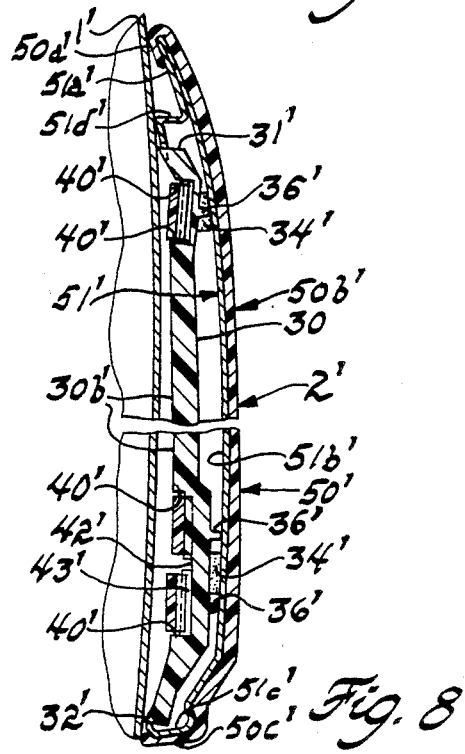
FIG. 8 is a cross-sectional view of the assembly of FIG. 6 taken along line 8—8 of FIG. 6.
Figure 11:
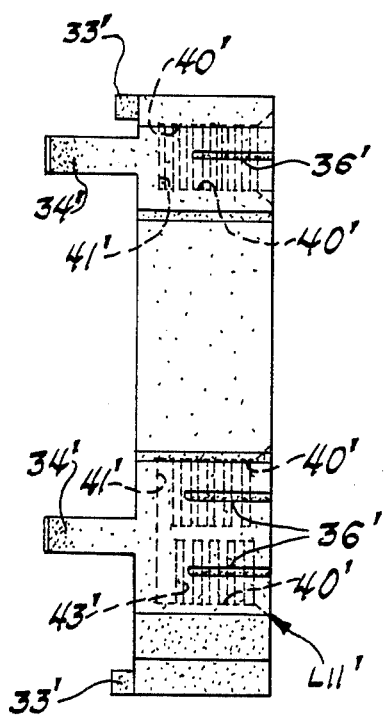
Figure 12:
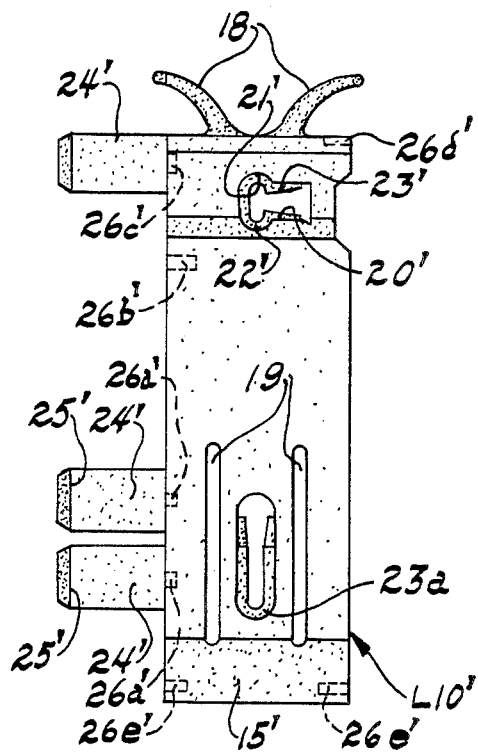

Referring now to FIGS. 6 to 8 there is shown a right hand embodiment of a molding/locator and attaching clip device for use in securing a relatively wide molding, generally designated 2', to a support panel 1' on one side or right hand side of a vehicle, while in FIGS. 11 and 12 there is shown the separate elements for a left hand version of the same embodiment of a molding-/locator and attaching clip device but orientated for use in securing a similar molding to a support panel on the opposite side of a vehicle.

As shown in FIGS. 6 and 7, a pair of headed studs 3 are secured, as by welding, to the support panel 1' whereby the subject clip device can be secured to the support panel 1' in a manner to be described, each set of these headed studs 3 being located in predetermined vertically spaced apart relationship to each other.

Since the right hand molding/locator and attaching clip device for the wide molding 2' is similar to the corresponding left hand molding/locator and attaching clip device except for the opposite orientation or location of certain parts thereof because of the difference in hand, only the right hand molding/locator and attaching clip device of FIGS. 6 to 8 will be described in detail herein.

Now, as best seen in FIGS. 6 and 7, the right hand embodiment of the molding locator and attaching clip assembly, made of a suitable plastic material, includes a molding retainer clip R10' and a molding locator clip R11'.

The molding retainer clip R10' includes a body portion 12' having on the upper side thereof, with reference to FIGS. 6 and 7, an outwardly extending pair of spring arms 18, commonly referred to as "bull horns" and at its opposite or lower side, the body portion 12' is provided with an integral, somewhat flexible finger 15' that terminates adjacent to its free end in a molding flange retainer 15a'.

In addition, the body portion 12' is provided with an upper key slot, of T-shape, that includes, with reference to FIG. 6, a horizontal extending base slot 20 and a vertical extending bar slot 21, the base slot 20 at its left hand end, with reference to FIG. 6 being sized so as to loosely receive the head of a headed stud 3, while the right hand end of this slot 20 is provided with lower restricted side shoulders 23 and the bar slot 21 is also provided with lower side shoulders 23 to capture the shank 3a of the head stud 3 and to effect retention of the head of the headed stud 3 in a known manner. In addition, the lower end of the body portion 12' is also provided with a vertical extending slot 20a and with lower restricted side shoulders 23a so as to receive and retain the lower-headed stud 3. Also as best seen in FIG. 6, the body portion 12' is provided with flexure slots 19 on opposite sides of the slot 20a to permit material of the body portion 12' around the slot 20a to be deflected down out of the normal plane of the upper surface of the body portion 12' so that the shoulders 23a can be engaged under the lower bearing surface of the head of the associate headed stud 3.

Again with reference to FIG. 6, the body portion 12' is provided with three spaced apart, reduced thickness tooth arms 24' extending outward from its right hand edge so as to define a plurality of resilient pawl or tooth arms 24', each having an upward extending pawl or tooth 25 thereon at its free edge. In the construction shown, there are three such tooth arms with their pawls or teeth 25 in vertical alignment with each other with reference to FIG. 6. In the construction shown, one of the tooth arms 24' is located next adjacent to the upper side of the body member 12', while the other two tooth arms 24' are located next adjacent to the lower side of the body member 12'.

Also, as best seen in FIGS. 6 and 7, the body member 12' is provided with spaced apart depending panel contact pads 26a, 26b, 26c, 26d and 26e. Thus as shown in part in FIG. 7, when the retainer molding clip R10' is secured by the headed studs 3 to the body panel 1', the body member 12' will be deflected such that these panel contact pads 26a, 26b, 26c, 26d, and 26e will abut against the body panel 1' even if the latter is slightly curved as shown in FIGS. 7 and 8.

Referring now to the molding locator clip R11', it includes a body portion 30', which as best seen in FIG. 3 from an end thereof, is of somewhat arched configuration so as to, in effect, have opposed lower and upper side edges 31' and 32', respectively, with reference to FIGS. 6 and 8. The body portion 30', at its right hand end with reference to FIGS. 6 and 8, is provided with spaced apart notched retaining tabs 33' forming an upper extension of the material forming the side edges 31' and 32' and, intermediate these retaining tabs 33' the body portion 30' is provided with a pair of flexible bias finger tabs 34', which in their as-molded configuration, extend a predetermined upward height above the maximum nominal height of the upper surface of the body portion 30'.

In addition and as best seen in FIGS. 6 and 8, the body portion 30' is also provided, in the construction illustrated, with a pair of upstanding anti-rattle ribs 36', extending parallel to each other and to the lower finger tabs 34', and a similar anti-rattle rib 36' is located adjacent the upper finger tab 34'.

The body portion 30', opposite the pair of lower finger tabs 34' and opposite the upper finger tab 34' is provided with an enlarged lower cavity and an upper cavity, each of which extends from the bottom or lower body surface 30b' and each such cavity is defined by spaced apart side walls 40', an end wall 41' and a base wall 42', the larger cavity being provided with two rows of spaced part ratchet teeth or detents 43' extending from the opening end of the cavity, while the smaller cavity has a single row of similar spaced apart ratchet teeth or detents 43'. Thus in the construction illustrated which is similar to that of molding locator clip R11, there are three such rows of detents 43' each including an inclined ramp surface 43a' and a flat abutment surface 43b' for the same purpose as described hereinabove with reference to the embodiment of FIGS. 1–5, with the spacing between the abutment surfaces 43b' being of a predetermined extent, as desired, for a construction shown and as best seen in FIG. 6, the abutment surfaces 43b' of the different row of detents 43, are staggered relative to each other for a purpose similar to that previously described with regard to the molding/locator and attaching clip device of FIGS. 1 to 5.

As shown in FIGS. 6 to 8, this embodiment of the molding/locator and attaching clip device is useful to attach a relatively wide molding 2' of a predetermined length to a metal support panel 1' of a vehicle, the support panel 1' also being of a predetermined complementary length at the attachment location of the molding 2'.

The molding 2', in the embodiment shown in FIGS. 6 to 8, includes an outer molding member 50' made of a suitable material, such as an extruded suitable plastic material, and a suitably attached inner metal open channel member 51' that conforms substantially in shape to the interior surface of the outer molding member 50'.

As best seen in FIGS. 7 and 8 and with reference thereto, the open channel member 51', in the construction illustrated, includes an upper return bent flange 51a' defining an abutment flange 51d', an intermediate curved main body portion 51b,, and a lower return bent flange 51c'. The outer molding member 50' includes an upper return bent flange 50a', which partly overlaps the return bent flange 51a' so as to leave a free end portion of this flange 51a' exposed, an intermediate portion 50b' which overlies the main body portion 51b' of the member 51' and a lower return bent flange 50c' that partly overlaps the flange 51c' of member 51' while leaving the free end of this flange 51c' exposed.

In addition and as best seen in FIG. 6 portions of the return bent flanges 51a' and 51c' are notched, as at 52' at predetermined longitudinal location for each molding locator clip R11' so as to define corner abutment/retainers 53' for the retaining tabs 33' whereby to limit movement of the molding 2' relative to an associate molding locator clip R11' in one direction, to the left with reference to FIG. 6 by engagement of the corner abutment-/retainers 53' against the associate body portion 30' of the molding locator clip R11'. These elements are shown as being out of contact in FIG. 6 for purpose of illustration only.

To effect assembly of the molding 2' to the support panel 1', each of the molding retainer clips R10' for retaining a particular molding 2' are secured to the necessary headed studs 3 previously fixed to the support panel 1'. An assembler would, as one step of the assembly process, position a molding retainer clip R10' so that the head of an associate lower headed stud 3 will first extend into the enlarged end of the base slot 20a' and then the molding retainer clip R10' is forcibly moved upward with reference to FIG. 6, to the position shown in this Figure. The molding retainer clip R10' can then be pivoted so that the molding retainer clip R10' can be secured by the upper headed stud 3 in a manner similar to that previously described in regard to the retainer molding clip R10, so that the molding retainer clip R10' is firmly secured to the support panel 1', while still permitting, with reference to FIG. 6, limited vertical up or down movement of this clip.

In addition, the molding locator clips R11' are attached to the molding 2' in the same manner as previously described in regard to the attachment of the molding locator clips R11 to the molding 2.

After all of the molding retainer clips R10' have been secured to the support panel 1' and all of the molding locator clips R11' have been secured to the associate molding 2', an assembler can then attach the molding 2' to the support panel 1' in a manner similar to that previously described hereinabove in regard to the attachment and positioning of the molding 2 to the support panel 1. However, it will be appreciated that in attaching the molding 2' onto the molding retainer clips R10', the molding 2' is first tilted so as to effect engagement of a portion of the upper return bent flange 51a' under the spring fingers 18 of the respective clips R10' and then while pivoting the molding 2' to a position such that the lower flange 51c' of the open channel member 51' will engage the free end flange retainers 15a' of the fingers 15', the assembler will apply downward force, with reference to FIGS. 7 and 8, on the molding 2' so as to cause sufficient bending of the spring fingers 18 whereby to permit the above engagement of lower flange 51c' with the free end of the fingers 15'. Thus after assembly of the molding 2' onto the molding retainer clip R10', the spring fingers 18 are then operative to apply an upward bias force so as to bias the free end of the lower flange 51c' into firm engagement against the free end flange retainer 15a' of the respective fingers 15' However, this bias force is such that the assembler can still move the molding 2' to the desired assembled position, as described hereinabove.

Again it will be apparent to those skilled in the art that left hand molding locator clip L11', shown in FIG. 11, and the left hand molding retainer clip L10', shown in FIG. 12, are structurally and functionally similar to the molding locator clip R11' and molding retainer clip R10', respectively, except for the change of hand.

While the invention has been described with reference to the structures disclosed herein, it is not confined to the specific details set forth, since it is apparent that various modifications and changes can be made by those skilled in the art. This application is therefore intended to cover such modifications or changes as may come within the purposes of the improvements or scope of the following claims.

The embodiments of the invention in which an exclusive property or privilege is claimed are defined as follows:

1. A molding/locator and attaching clip device, for securing an open channel molding with notched sheet metal return bent flanges therein to a support panel having headed studs fixed thereto, includes a molding retainer clip and a molding locator clip, said molding retainer clip including a body portion having at least one keyhole slot therein whereby said molding retainer clip can be secured to an associate said headed stud on said support panel, with opposite sides of said body portion defining retaining means for opposite ends of said open channel molding, a plurality of resilient pawl arms extending outward from one end of said body portion of said molding retainer clip; said molding locator clip including a locator body portion having opposed first and second edges, spaced apart retaining tabs extending outward from said first edge of said locator body portion adjacent to the opposite sides thereof, at least one spring finger tab extending outward from said first edge intermediate said retaining tabs and, anti-rattle ribs extending upward from one surface of said locator body portion so as to cooperate with said retaining tabs and said spring finger tab whereby said molding locator clip can be secured into a said notched return bent flanges of said molding, said locator body portion on the surface thereof opposite from said anti-rattle ribs having at least one cavity therein extending inward from said second edge and defined in part by a plurality of rows of spaced apart ratchet teeth, the arrangement being such that when said open channel molding with said molding locator clip fixed thereto is secured to said molding retainer clip, said resilient pawl arms are adapted to operatively engage said ratchet teeth to permit movement of said molding locator clip and said open channel molding in only one direction while preventing movement thereof in an opposite direction.

2. A molding/locator and attaching clip device according to claim 1, wherein said molding retainer clip has three of said resilient pawl arms extending outward from said body portion and wherein said molding locator clip has three rows of said spaced apart ratchet teeth, with said spaced apart ratchets in each of said rows being offset relative to each other.

3. A molding/locator and attaching clip device, for securing an open channel molding with notched sheet metal return bent flanges therein to a support panel having headed studs fixed thereto, includes a molding locator clip and a molding retainer clip, said molding retainer clip including a locator body portion having opposed first and second edges, spaced apart retaining tabs extending outward from said first edge of said locator body portion adjacent to the opposite sides thereof, at least one spring finger tab extending outwardly from said first edge intermediate said retaining tabs and, anti-rattle ribs extending upward from one surface of said locator body portion so as to cooperate with said retaining tabs and said spring finger tab whereby said molding locator clip can be secured into a said notched return bent flanges of said open channel molding, said locator body portion on the surface thereof opposite from said anti-rattle ribs having at least one cavity therein extending inward from said second edge and defined in part by a plurality of rows of spaced apart ratchet teeth; said molding retainer clip including a body portion having at least one keyhole slot therein whereby said molding retainer clip can be secured to an associated said headed stud on said support panel, opposite sides of said body portion defining retaining means for opposite ends of said open channel molding, a plurality of resilient pawl arms extending outward from one end of said body portion of said molding retainer clip for engagement with said rows of spaced apart ratchet teeth when said open channel molding is secured to said molding retainer clip whereby said molding can be moved in one direction and prevented from moving in an opposite direction.

* * * * *